(12) United States Patent
Yang

(10) Patent No.: US 6,754,841 B2
(45) Date of Patent: Jun. 22, 2004

(54) ONE-WIRE APPROACH AND ITS CIRCUIT FOR CLOCK-SKEW COMPENSATING

(75) Inventor: Ching-Yuan Yang, Tong-Shiau (TW)

(73) Assignee: Archic Technology Corporation, Taipei (TW)

( * ) Notice: Subject to any disclaimer, the term of this patent is extended or adjusted under 35 U.S.C. 154(b) by 621 days.

(21) Appl. No.: 09/842,723

(22) Filed: Apr. 27, 2001

(65) Prior Publication Data

US 2002/0169994 A1 Nov. 14, 2002

(51) Int. Cl.[7] .................................................. G06F 1/04
(52) U.S. Cl. ........................ 713/503; 713/401; 713/600
(58) Field of Search ................................. 713/400, 401, 713/500, 503, 600

(56) References Cited

U.S. PATENT DOCUMENTS

| | | | | |
|---|---|---|---|---|
| 6,131,149 A | * | 10/2000 | Lu et al. ..................... | 711/167 |
| 6,166,572 A | * | 12/2000 | Yamaoka .................... | 327/149 |
| 6,463,092 B1 | * | 10/2002 | Kim et al. .................. | 375/219 |
| 6,522,188 B1 | * | 2/2003 | Poole ......................... | 327/407 |

* cited by examiner

Primary Examiner—Dennis M. Butler
(74) Attorney, Agent, or Firm—Bacon & Thomas, PLLC

(57) ABSTRACT

A one-wire clock-skew compensating method and a circuit for the method are disclosed to solve the clock-skew problem in transmission of clock signals in a high-speed synchronous circuit such as of a CPU, hence the clock of a remote circuit and the clock input of the system can be accurately synchronized. The method is based on the principle of identical propagation delay on the forward and reverse paths at the two ends of one wire in transmission and receiving; a clock-deskew buffer composing a delay locked loop and a bidirectional buffer is provided in the front of the signal transmission end of the wire, while the other end of the wire has a bidirectional buffer too, hence signals are transmitted bidirectionally at the same time on the wire. When a signal is transmitted from the clock-deskew buffer to the latter bidirectional buffer through the forward and reverse paths, its arrival time is accurately controlled to avoid errors in dealing with signals due to phase difference between a reference clock and a remote clock as in conventional techniques.

11 Claims, 15 Drawing Sheets

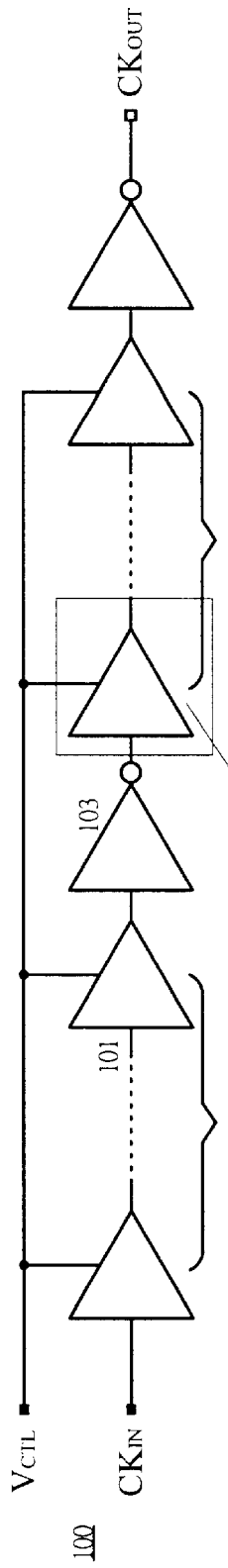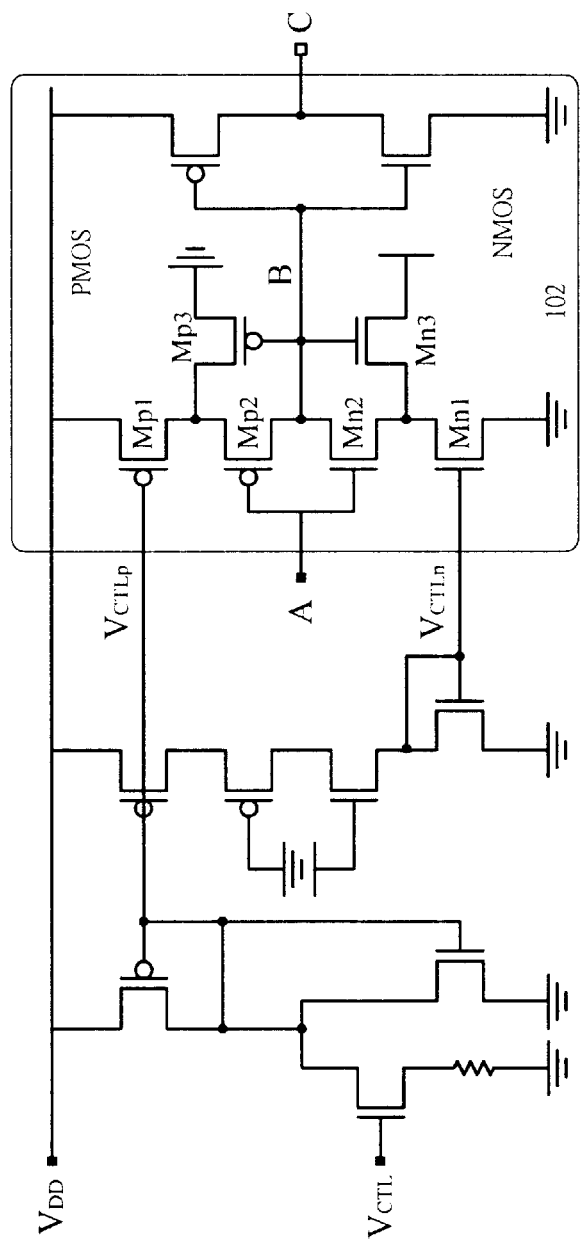
Fig.6 (a)
Fig.6 (b)

| Technology | 0.35-μm CMOS |
|---|---|
| Supply voltage | 3-V |
| Power | 218 mW @ 120-MHz |
| rms jitter | 10.8 ps @ 120-MHz |
| pk-pk jitter | 87 ps @ 120-MHz |
| Chip area | 980 ×1700 $\mu m^2$ |

Fig.16

ONE-WIRE APPROACH AND ITS CIRCUIT FOR CLOCK-SKEW COMPENSATING

FIELD OF THE INVENTION

The present invention is related to a one-wire clock-skew compensating method and a circuit for this method, and especially to such a method and a circuit used to solve the clock-skew problem in transmission of clock signals in a high-speed synchronous circuit such as of a CPU of a computer, in order that the clock of a remote circuit and the clock input of the system can be accurately synchronized.

DESCRIPTION OF THE PRIOR ART

To high-speed synchronous circuits, clock-skew may result errors in access of information; especially when the technology advances rapidly today, if there are errors in access of important information, serious damage may be induced. For example, the clock frequencies of CPUs of computers determine the rate of data processing in CPUs, the clock frequencies in I/O and memory buses determine the rate of data transmission, and the clock frequencies in networks determine the rate of data transmission. In view of this, clock-skew reduction issue will be more and more important in future.

Since the skews are subject to influences of process, voltage supply, temperature, and loading (PVTL), it will result in the uncertainty of the arrival of the clock signal at a given circuit storage element (such as a flip-flop), and thereby result in the error of access of information. Once the internal clocks in a multi-chip system become asynchronous, the data transfer between chips will fail, and this is especially the case of a large-size printed circuit board. Hence, one needs the skew-free apparatus to guarantee that the circuits will function properly in a machine time cycle.

Many approaches exist for dealing with clock synchronization. Phase locked loops (PLLs) and delay locked loops (DLLs) are the two modes most widely adopted to solve the clock-skew issue. Wherein, the PLLs has the function of frequency synthesizing, it has the problem of accumulation of phase difference though, and is more suitable for making a clock generator rather than for chip-to-chip compensation for the skew. Due to the board wiring and packaging, DLLs do not have the problem of accumulation of phase difference, rather, they have faster locking speed, thus are more stable and useful to compensate for the skew to solve the asynchronous problem of the chips on electric circuit boards.

Generally, the structure of a conventional clock-deskew buffer circuit with a DLL is shown in FIGS. 1 and 2. It contains mainly a DLL 1, a plurality of internal buffers 2, and a pair of wires 3, 4 externally. Assuming that the two wires 3, 4 are matched, then the phases of the reference clock and the remote one are equal, the DLL 1 can be used to insert a time delay to synchronize the output clock and the input clock, i.e., to have the same phase. Once there is mismatch between both wires 3, 4, it may result in the phase difference between the reference clock ($CK_{REF}$) and the remote clock ($CK_{RMT}$).

SUMMARY OF THE INVENTION

To solve the mismatch of the two wires, a clock-skew compensating method with a single wire with bidirectional buffers and a circuit structure for the method are proposed. The idea is based on the fact that the forward and reverse paths in transmission and receiving of signals respectively at the two ends of the single wire are of the same electrical length, i.e., propagation delay for sending and receiving signals is same. Therefore, a clock-deskew buffer composed of a DLL and a bidirectional buffer is provided in the front of the signal transmission end of the single wire, while the other end of the single wire is provided with a bidirectional buffer too. In this way, signals can be transmitted bidirectionally at the same time on the single wire. When a signal is transmitted from the clock-deskew buffer to the receiving bidirectional buffer in a way passing through the forward and reverse paths, the arrival time thereof can be accurately controlled, this can avoid errors in dealing with signals due to phase difference between the reference clock ($CK_{REF}$) and the remote clock ($CK_{RMT}$) as in conventional techniques.

The present invention will be apparent after reading the detailed description of the preferred embodiment thereof in reference to the accompanying drawings.

BRIEF DESCRIPTION OF THE DRAWINGS

FIG. 6 is a circuit diagram showing implementation of a ten-stage voltage controlling delay line of the present invention formed from delay cells which are all the same as a Schmitt trigger circuit with current bias;

FIG. 16 shows the result of the operational characteristics of the test on the clock-deskew buffer chip made according to the method of the present invention.

DETAILED DESCRIPTION OF THE PREFERRED EMBODIMENTS

Figure 1:
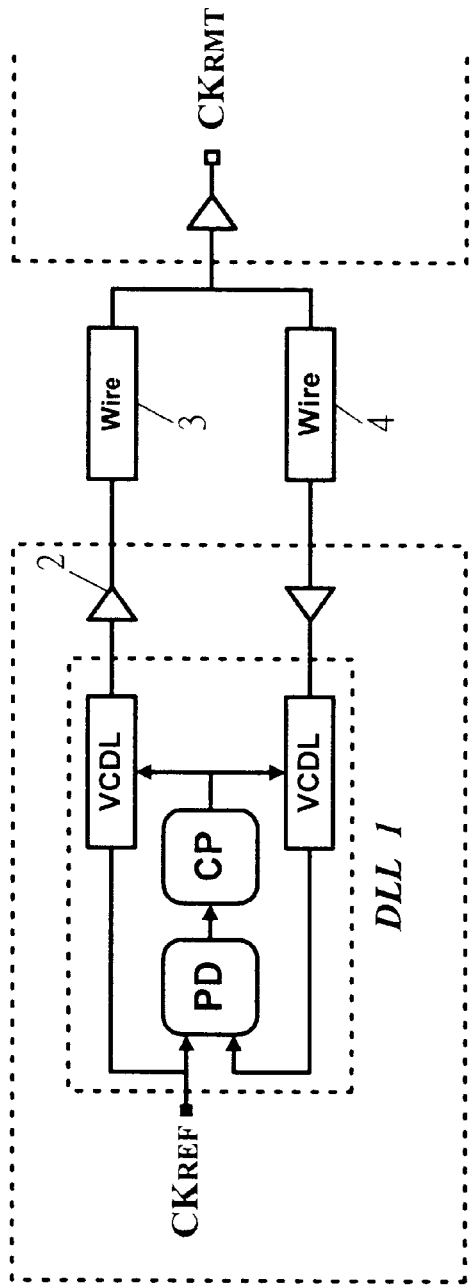
FIGS. 1 and 2 are two block diagrams respectively of conventional clock-deskew buffer circuits.
Figure 2:
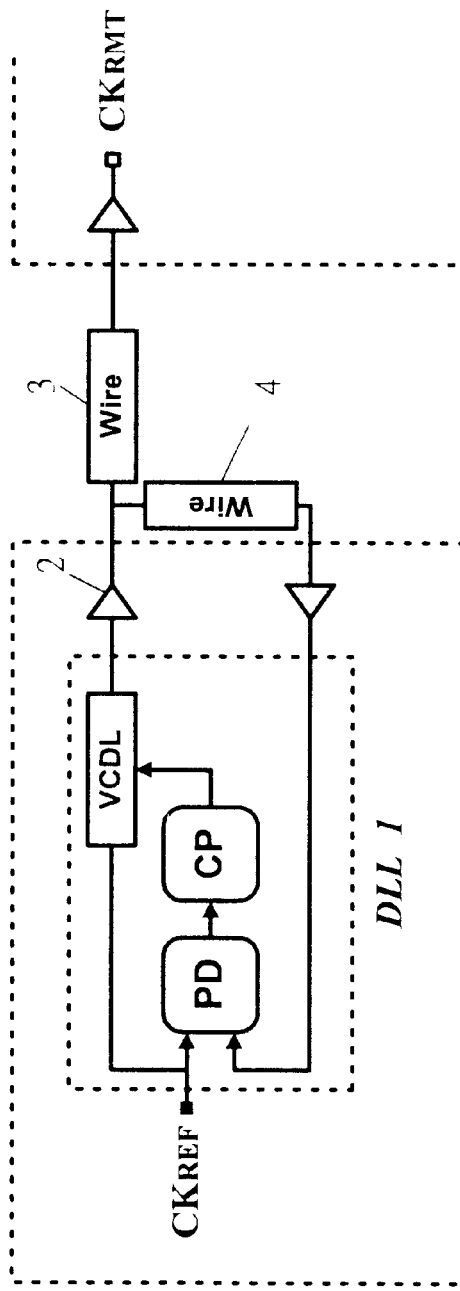
Figure 3:
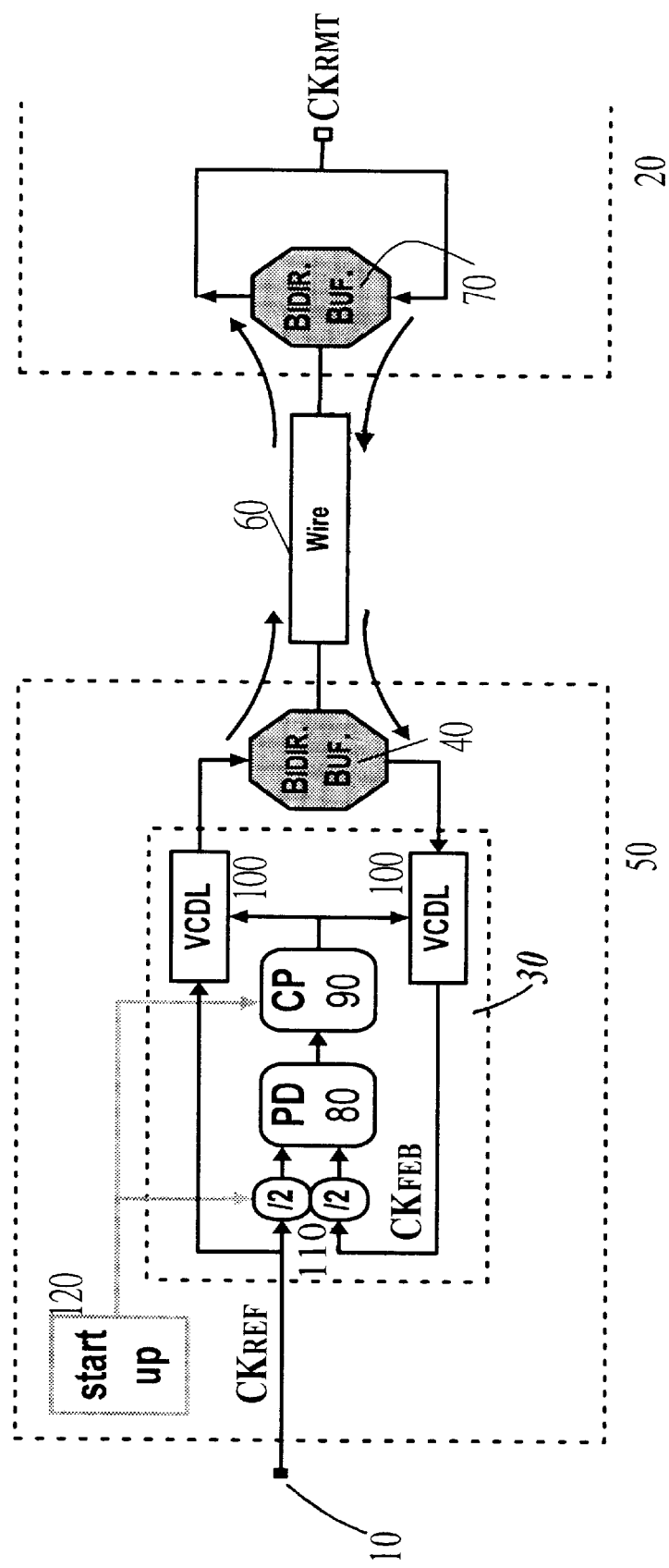
FIG. 3 shows a block diagram of a clock-deskew buffer circuit of the present invention.

Referring to FIG. 3, the electric circuit structure in the method of the present invention is to provide between an external reference clock 10 and a remote chip 20 a clock-deskew buffer 50 composed of a delay locked loop (DLL) 30 and a first bidirectional buffer (BIDIR.BUF.) 40, a transmission wire 60 and a second bidirectional buffer 70. When a signal on the external reference clock 10 is transmitted [input reference clock ($CK_{REF}$)] through the clock-deskew buffer 50, the transmission wire 60 and the second bidirectional buffer 70 to the remote chip 20 [remote clock ($CK_{RMT}$)] and then is transmitted back from the remote chip 20 as a clock feedback signal, by identical electric length and propagation delay of the forward and reverse paths of the transmission wire 60, mismatch resided in the conventional two-wire techniques can be avoided.

The delay locked loop (DLL) 30 of the above electric circuit structure is further provided with: a phase detector (PD) 80, a charge pump (CP) 90 including a wave filtering capacitor, and two voltage control delay lines (VCDLs) 100. Assuming that the two VCDLs 100 are matched with each other in the electric circuit structure of the clock-deskew buffer 50 (the problem of match between the two VCDLs 100 generally exists in every normal delay locked loop (DLL) 30 and is not a subject for study of the present application), one can calculate the propagation delay from the reference clock ($CK_{REF}$) to the remote one ($CK_{RMT}$) through a VCDL 100, via the first bidirectional buffer 40 and the external transmission wire 60 to the second bidirectional buffer 70 of the remote chip 20. For the skew buffer, it can be given as:

$$T_{REF\_RMT} = T_{VCDL+TBFi} + T_{TR} + T_{BFo} \quad (1)$$

Wherein, $T_{VCDL}$ is the time delay for the clock going through the VCDL 100, $T_{TR}$ is the delay time of the external transmission wire 60, and $T_{BFi}$ and $T_{BFo}$ are the delays caused by the first and the second bidirectional buffers 40, 70 from the two VCDLs 100 to the transmission wire 60 and from the transmission wire 60 to the remote chip 20, respectively. While the clock ($C_{RMT}$) of the remote chip 20 is fed back to the phase detector 80 with the propagation delay $T_{RMT\_REF}$, which is equal to $T_{REF\_RM}$. Therefore, in the steady state of the delay locked loop (DLL) 30, the clock signals $CK_{REF}$ and $CK_{FEB}$ are in-phase, i.e., $$2(T_{VCDL} + T_{BFi} + T_{TR} + T_{Bfo}) = NT_{CKREF} \; N \geq 1, \quad (2)$$

Wherein, $T_{CKREF}$ is the period of the external reference clock ($CK_{REF}$) 10. However, the phase difference of π radius may exist between the external reference clock and the remote one if N is odd. Thus, to ensure both signals are in-phase, N should be even, thus divide-by-2 circuits 110 (/2) are added in the front of the phase detector 80.

Next, in considering the initial problem of the DLL 30, a start-up controlled circuit 120 is added in the deskew circuits. In our design, the phase detector 80 will be set to make the charge pump 90 inactive initially, and the voltage on the filter of the charge pump 90 will be charged in advance to a half of the supply voltage.

The present invention will be further described below to show the preferred embodiments thereof with an electric circuit structure using a one-wire clock-skew compensating method.

Figure 4:
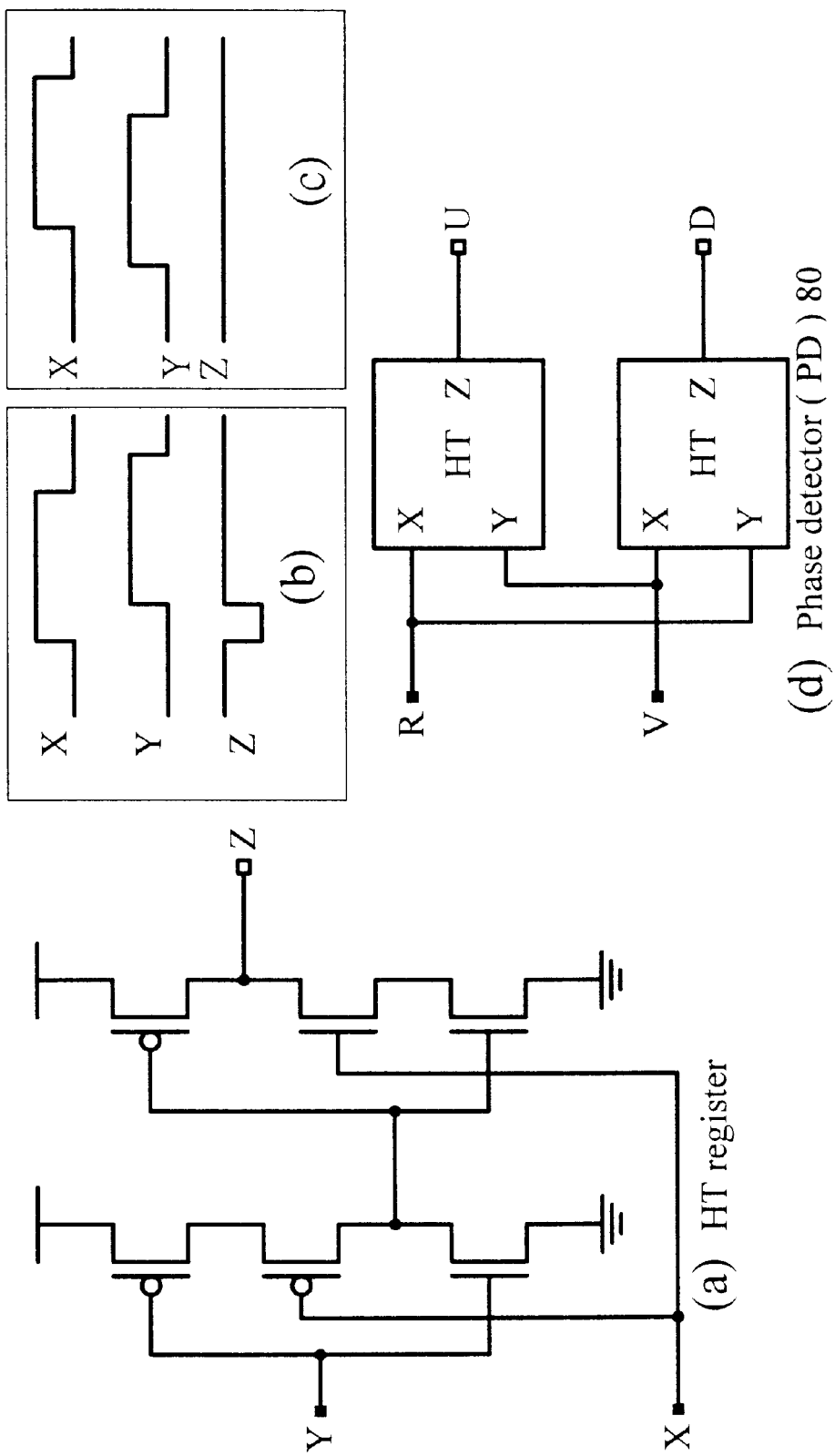
FIG. 4 shows an embodiment of a phase detector of the present invention, it is depicted to have therein a half-transparent register (a), and to show the time sequence actions (b), (c) and the action of the whole detector (d)

As shown in FIG. 4, in the abovementioned circuit structure, the phase detector 80 is preferably a dynamic phase detector, this is mainly because that some conventional phase detectors has the drawback of having a dead zone which generates the phase error in the output signal. When the phase error is within the dead zone, the charge pump does not charge the capacitor, and more serious phase jitter may appear. To solve this problem, a dynamic CMOS phase detector is adopted in the present invention.

The dynamic CMOS phase detector (PD) 80 adopted in the present invention is shown in FIG. 4. The phase detector (PD) 80 is a symmetrical circuit, i.e., the circuit is composed of two half-transparent (HT) registers which are composed each of six transistors as shown in FIG. 4(a). FIG. 4(b) shows a timing diagram of an HT register. In the HT register, if the X signal leads the Y signal, there is an output signal to denote their phase difference. Otherwise, the output signal is inactive and still maintains high as shown in FIG. 4(c). In this way, the phase detector 80 can be combined with two HT registers as shown in FIG. 4(d). The phase difference of the input signal can be accurately put out, and in FIG. 4(d), U indicates R leading V, D indicates R being led by V. Compared to the conventional phase detector, the proposed dynamic phase detector 80 can overcome the speed limitation and reduce the dead zone. The input signals of the phase detector are driven by the preceding divide-by-2 circuits 110 (/2) (FIG. 3), so they do not operate until the start-up scheme becomes active, and have a normal duty cycle of 50 percentages.

Figure 5:
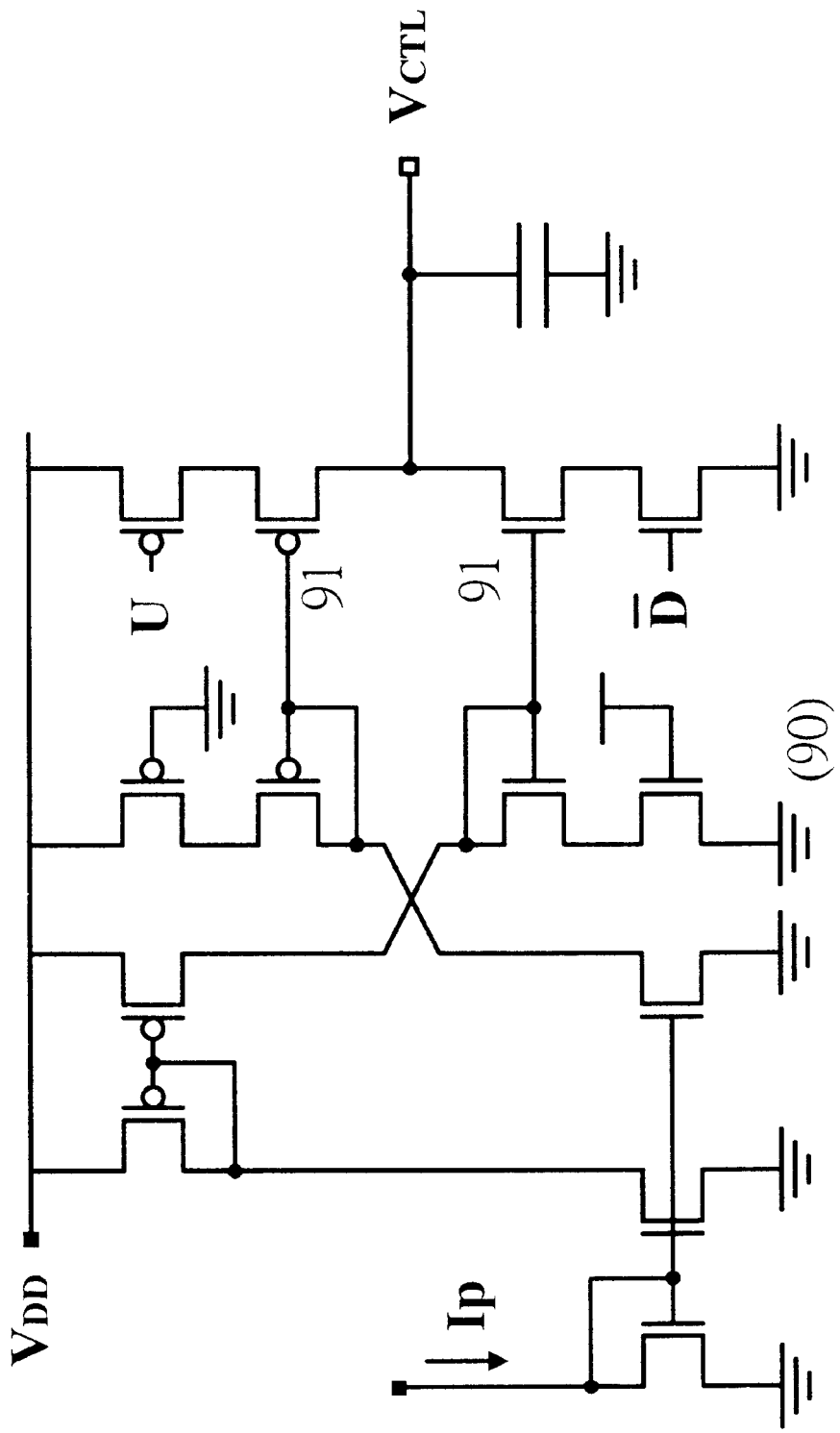
FIG. 5 shows a circuit diagram of an embodiment of an electric charging pump of the present invention.

The circuit related to the charge pump 90 with an associated wave filtering capacitor is shown in FIG. 5. The function of the charge pump 90 is to turn the output signal into a direct current voltage to control the output at an output node $V_{CTL}$. A common problem in the charge pump 90 is the phase offset resulting from the charge injecting errors induced by the parasitic capacitance of the switching transistors U and D and current source transistors 91. To mitigate this problem, the current source transistors 91 are connected to the output node $V_{CTL}$ to reduce influence of electric charge sharing. In addition, the output signal can avoid being subjected to influence of the switching noise induce by the gate-to-drain overlap capacitance of the switching transistors U, D.

The implementation of a ten-stage delay cell 101 forming the voltage controlled delay line 100 is shown in FIG. 6(a). The delay cells 101 each is the same as the Schmitt trigger circuit 102 with current bias as shown in FIG. 6(b). The Schmitt trigger circuit is split into an upper (PMOS) and a low (NMOS) segment. The MOSFET Mn2 (Mp2) is the main switching device, while the Mn1 (Mp1) acts as a current bias and Mn3 (Mp3) acts as a feedback circuit which controls the forward (reverse) transition value. Assuming that the input is set to $V_A = 0$ and then is increased, the gate-source voltages of the n-channel transistors (NMOS) are:

$$V_{GS1}=V_{CTLn} \quad (3)$$

$$V_{GS2}=V_A-V_{DS1} \quad (4)$$

$$V_{GS1}=V_B-V_{DS1} \quad (5)$$

However, Mn2 requires the input voltage of $$V_A=V_{Tn}+V_{DS1} \equiv V_+ \quad (6)$$

to be active. Increase $V_A$ but decrease $V_{DS1}$ until the critical switching condition is met to turn Mn2 on. When this point is reached, the output node grounds through Mn1 and Mn2, and the output voltage falls to zero. The forward trigger voltage $V_+$ can be estimated by ignoring body effects. To turn on Mn2 requires a drain-source voltage of $$V_{DS1}=V_+-V_{Tn} \quad (7)$$

on Mn1, with the current of $$I_{Dn1}=\frac{\beta_{n1}}{2}(V_{CTLn}-V_{Tn})^2. \quad (8)$$

Mn3 is also saturated with the current $$I_{Dn3}=\frac{\beta_{n3}}{2}(V_{DD}-V_+)^2. \quad (9)$$

Equating $I_{Dn1}=I_{Dn3}$ and it gives $$V_+=V_{DD}-\sqrt{\beta_{n1}/\beta_{n3}}(V_{CTLn}-V_{Tn}) \quad (10)$$

as the forward trigger voltage. Similarly, the reverse trigger voltage $V_{31}$ can be obtained by the complementary analysis, and it gives $$V_-=\sqrt{\beta_{p1}/\beta_{p3}}(V_{CTLp}-V_{Tp}) \quad (11)$$

By varying the control voltage $V_{CTL}$, both the trigger points and the output time constant of the delay cells can be changed, thus the phase shift of the input signal can be affected.

The problem of the delay elements is that the propagation delay through the unit delay cell resulting from a high-to-low transition is not equal to the delay of a low-to-high transition, i.e., $t_{PHL} \neq t_{PLH}$. Further, this delay varies from one to the next one, accumulation of the delays will make the situation serious. To avoid the problem, the ten-stage delay line 100 is divided into two symmetric parts 5'S with an inverter 103. For each input signal, the number of the high-to-low transitions is equal to that of the low-to-high transitions from the first delay cell to the last one.

Figure 7:
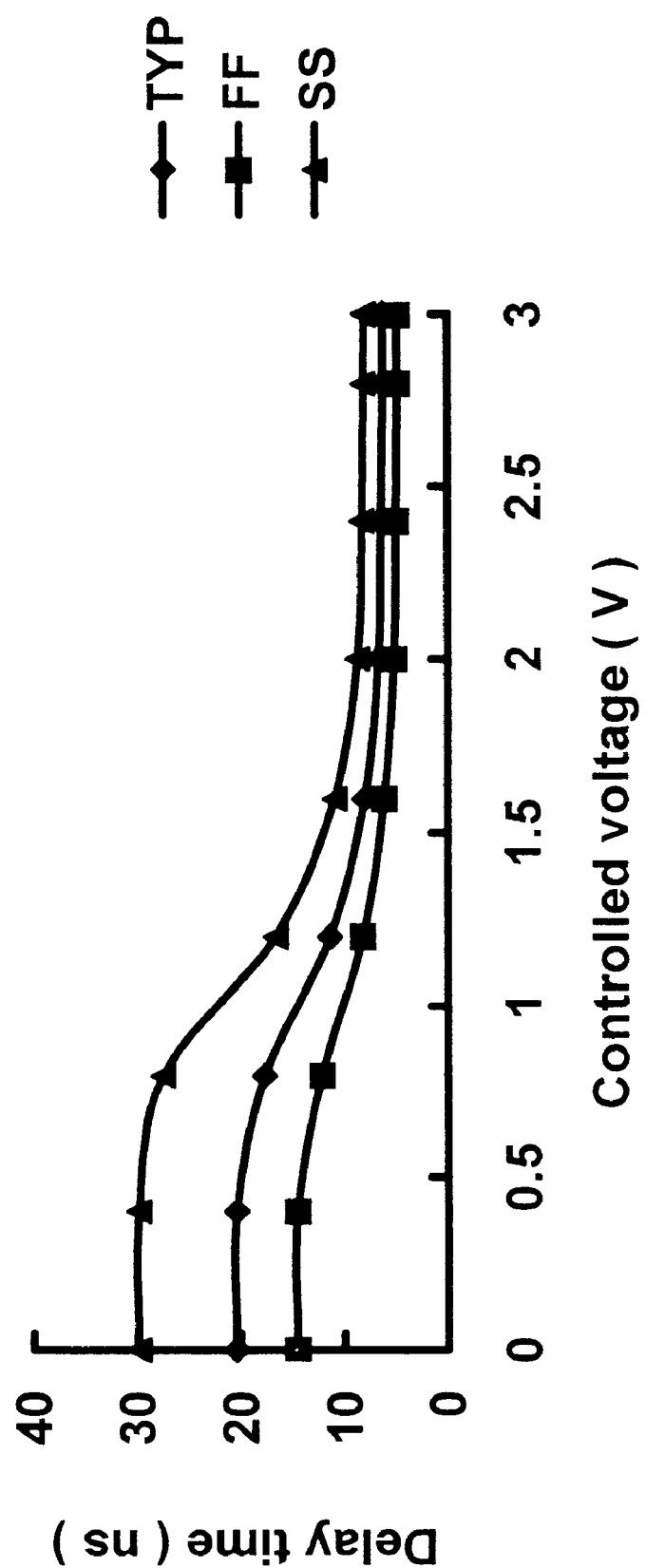
FIG. 7 shows coordinate curves expressing the characteristics of delay lines being simulated for three different processing conditions of the present invention.
Figure 8:
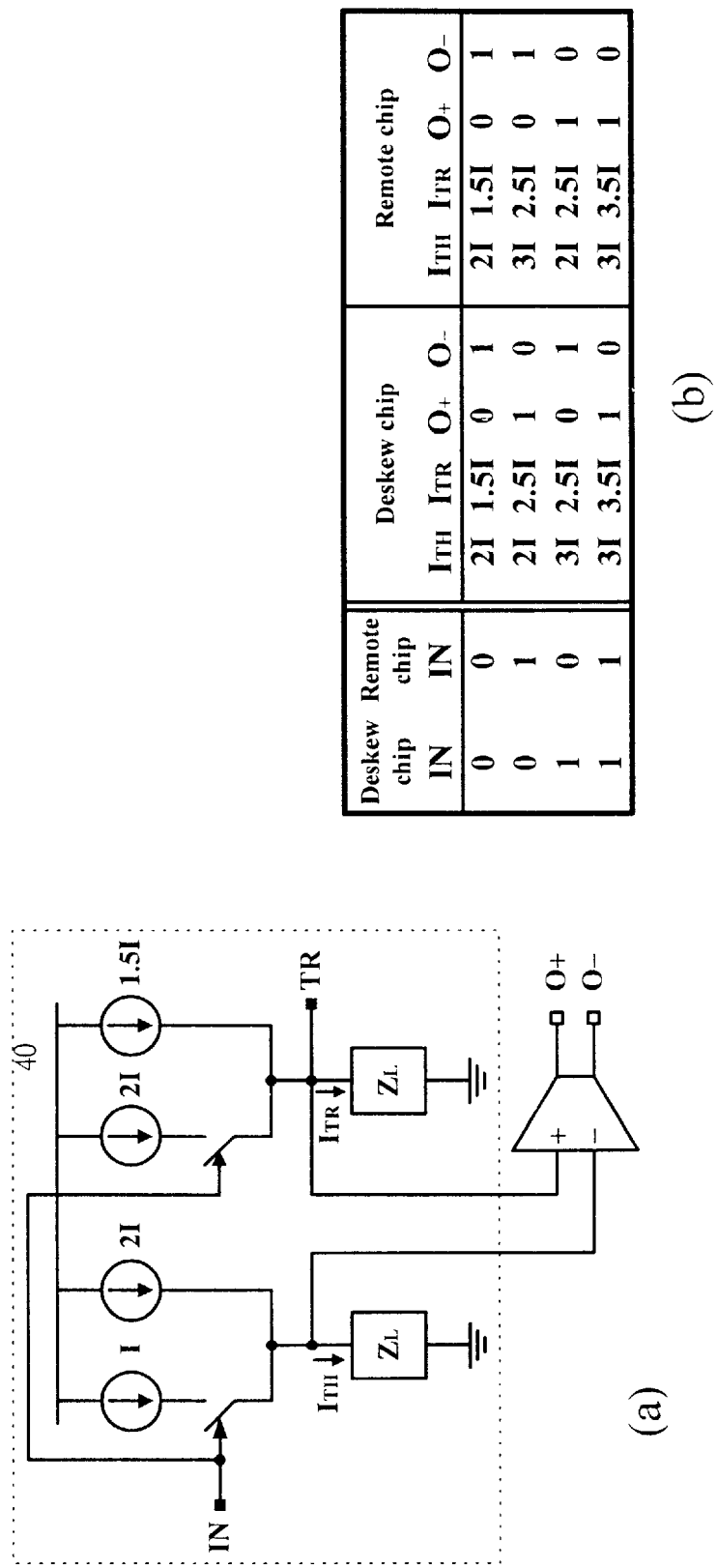
FIG. 8 shows an embodiment of a bidirectional buffer of the present invention, the drawing includes a block diagram (a) of the bidirectional buffer and a reference table (b) for a clock-deskew buffer chip and a remote chip.

The above stated voltage controlled delay line 100 can provide parameters for production of transistors in a wafer factory. It is simulated for three different processing conditions, as depicted in FIG. 7; wherein, TYP is the typical process, FF is the faster process, while SS is the slower process. It can be seen from the drawing that, when the controlled voltage reaches the value of 3V, the full range of delay time through the voltage controlled delay line 100 can be provided is 10 ns. Therefore, the minimum frequency that can always be deskewed by the DLL theoretically is 100 MHz, The function of the first and second bidirectional buffer 40, 70 depicted in FIG. 3 is rendering capable of simultaneous transmission of signals in both directions on the transmission wire 60. A simplified structure of the current-mode bidirectional I/O buffer 40 is depicted as an example in FIG. 8. The outgoing input signal and a wire connected node are denoted with IN and TR respectively, and the received data appear at O+ (O− is its reverse phase). The current sources are used to transmit the digital signals on the wire. According to the outgoing signals, the received data are decoded by adjusting the threshold of the receiver. For example, the encoding and decoding states are shown in the table of FIG. 8(b); in the digital signals transmitted, the outgoing input signals of the clock-deskew buffer chip and the remote chip are 1 and 0, respectively. Assuming driving loads of both are the same $Z_L$ [FIG. 8(a)], the driving current $I_{TR}$ of each chip averagely is 2.5 I, in comparison with the reference threshold current $I_{TH}$ of 3 I in the deskew chip, the correspondence output value of $O_+$ becomes 0 through a comparator. Similarly, the output value of $O_+$ is 1 in the remote chip. According to a direct extension of the above example with both IN's values, it correctly decodes the correspondence current at the receiver.

Figure 9:
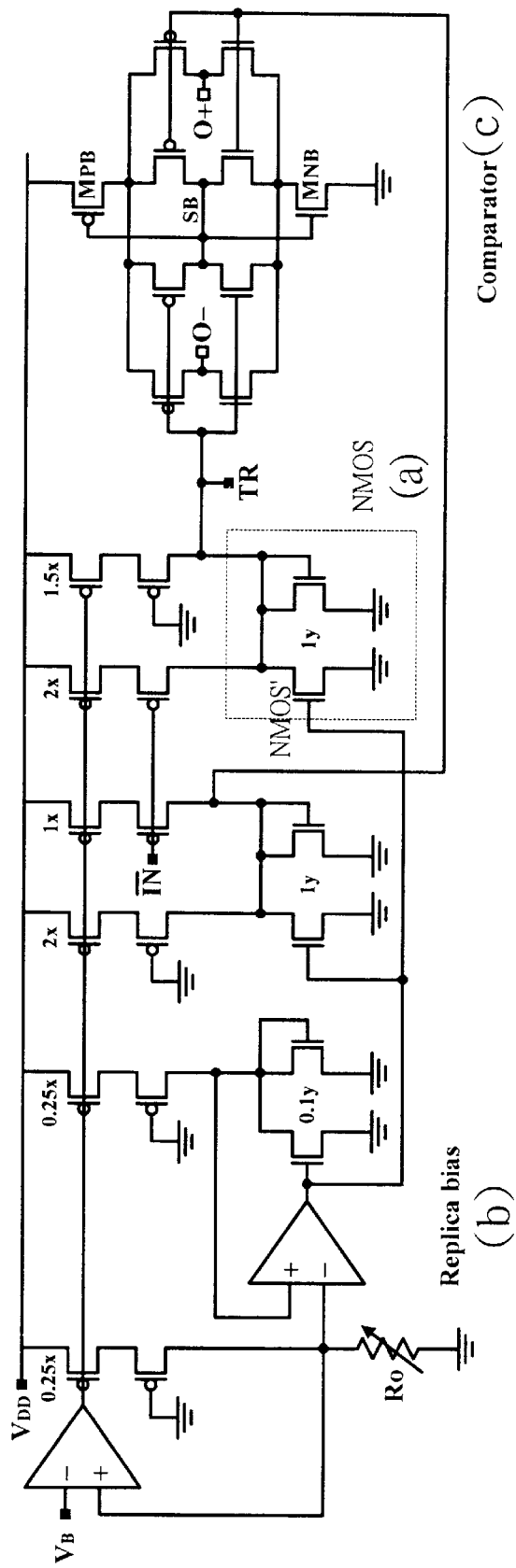
FIG. 9 is a circuit diagram of a first bidirectional buffer of the present invention (a second bidirectional buffer of the present invention is the same as this embodiment); wherein, the first bidirectional buffer is provided with a load element (a), as shown in the dotted circle, a replica-bias circuit (b) and a decoder (c)

FIG. 9 is a circuit diagram of the first bidirectional buffer 40; the second bidirectional buffer 70 is the same as this embodiment. The first bidirectional buffer 40 is provided with a load element as shown by the dotted circle in FIG. 9(a) [it is exactly same as a driving load $Z_L$ in FIG. 8(a)] in consideration that the load output must be matched with the impedance of the conductor, and is formed by parallel connection of an NMOS device of a diode with an NMOS' device controlled by bias voltage. It has higher dynamic supply noise rejection than the passive linear resistor elements. FIG. 9(b) shows that a replica-bias circuit is used to adjust the impedance. Generally, most of the power of the bidirectional buffer is consumed in driving the output nodes. Considering avoiding overly consumption of the power, the size of the replica-bias circuit is scaled down by the ratio of ten. The output equivalent resistance of the transistors is equal to the one-tenth of the external resistor $R_0$.

The decoder shown in FIG. 9(c) is a high-speed fully differential comparator (complementary comparator), which can have a wide common mode range. This fully differential (complementary) comparator is self-biased through the negative feedback loop that stabilizes the bias voltages. This self-biased technique is added to sense the common mode level of the two inputs signals and to adjust the bias currents in the circuit of the comparator. For this comparator, the internal node SB sensing the common mode variation of input signals in FIG. 9(c) is connected to control $M_{PB}$ and $M_{NB}$, such that the output common mode level is almost unchanged.

Figure 10:
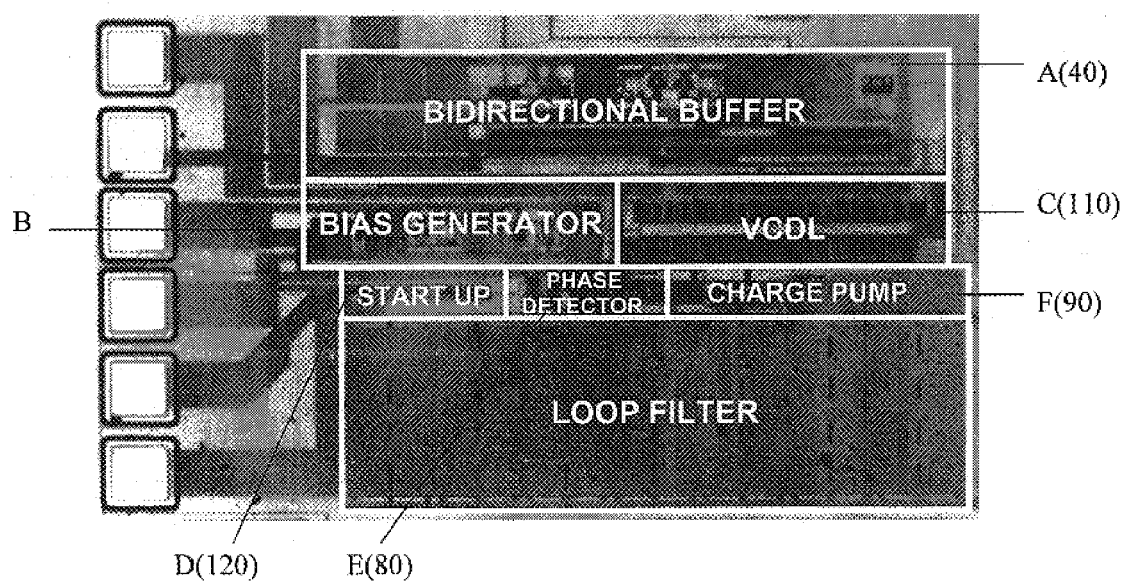
FIG. 10 is a photo of a clock-deskew buffer chip made according to the method of the present invention.

FIG. 10 shows a microphotograph of the clock-deskew buffer chip made according to the method of the present invention. Wherein, "A" block indicates the bidirectional buffer 40, "B" block indicates the bias generator (this is a conventional element which has nothing to do with the subject technique of the present invention, and thereby is not further described hereinafter), "C" block indicates the voltage control delay lines (VCDL) 100, "D" block indicates the start-up controlled circuit 120, "E" block indicates the phase detector 80, "F" block indicates the charge pump 90, while "G" block indicates the loop filter (this is a conventional element which has nothing to do with the subject technique of the present invention, and thereby is not further described hereinafter). A skew compensating clock buffer is fabricated in a 0.35-μm N-well CMOS technology. The chip size is 980×1700 μm² including a pad areas. SMA connectors connect chips on the printed circuit board via one coaxial cable of RG 188 as the transmission line. The characteristic impedance of the transmission cable is 50Ω.

Figure 11:
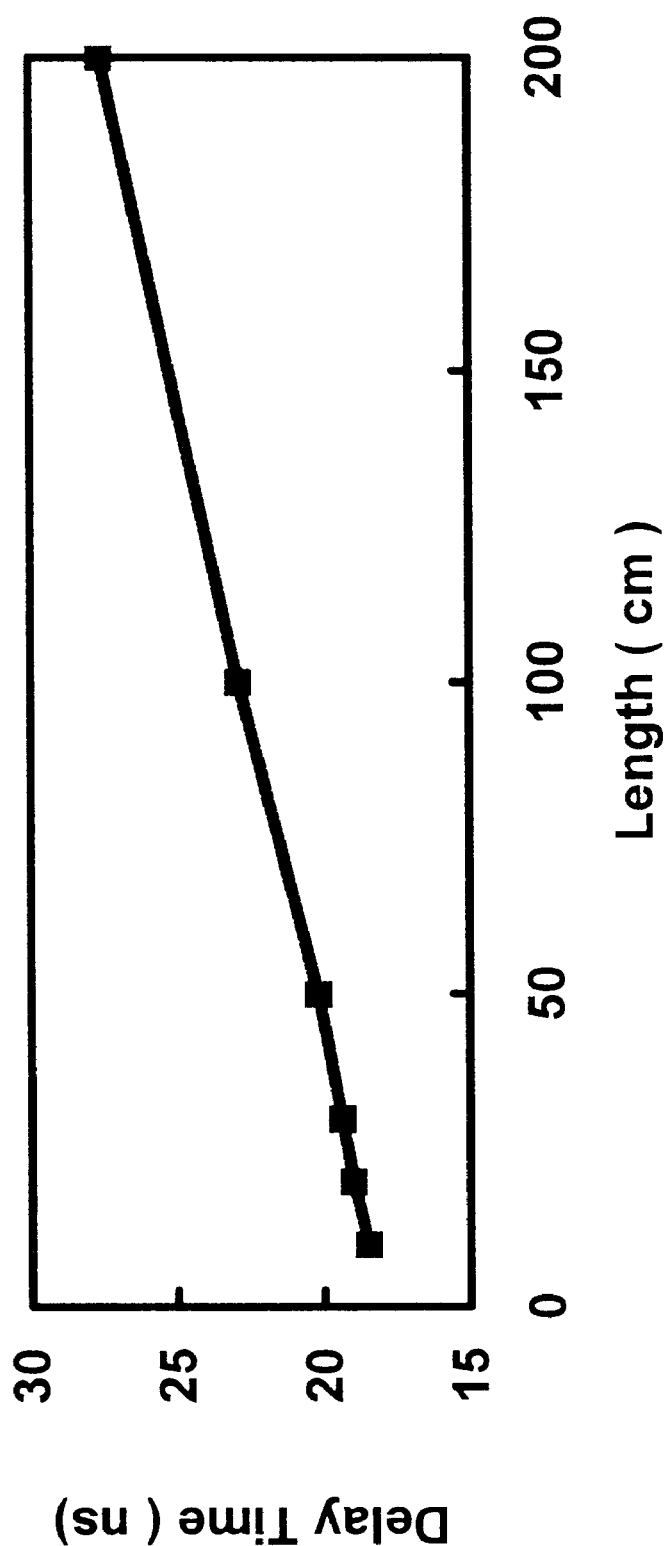
FIG. 11 shows the result of a test on the clock-deskew buffer chip made according to the method of the present invention, wherein, a curve is depicted to show the relation between the initial delay time and different transmission lengths.
Figure 12:
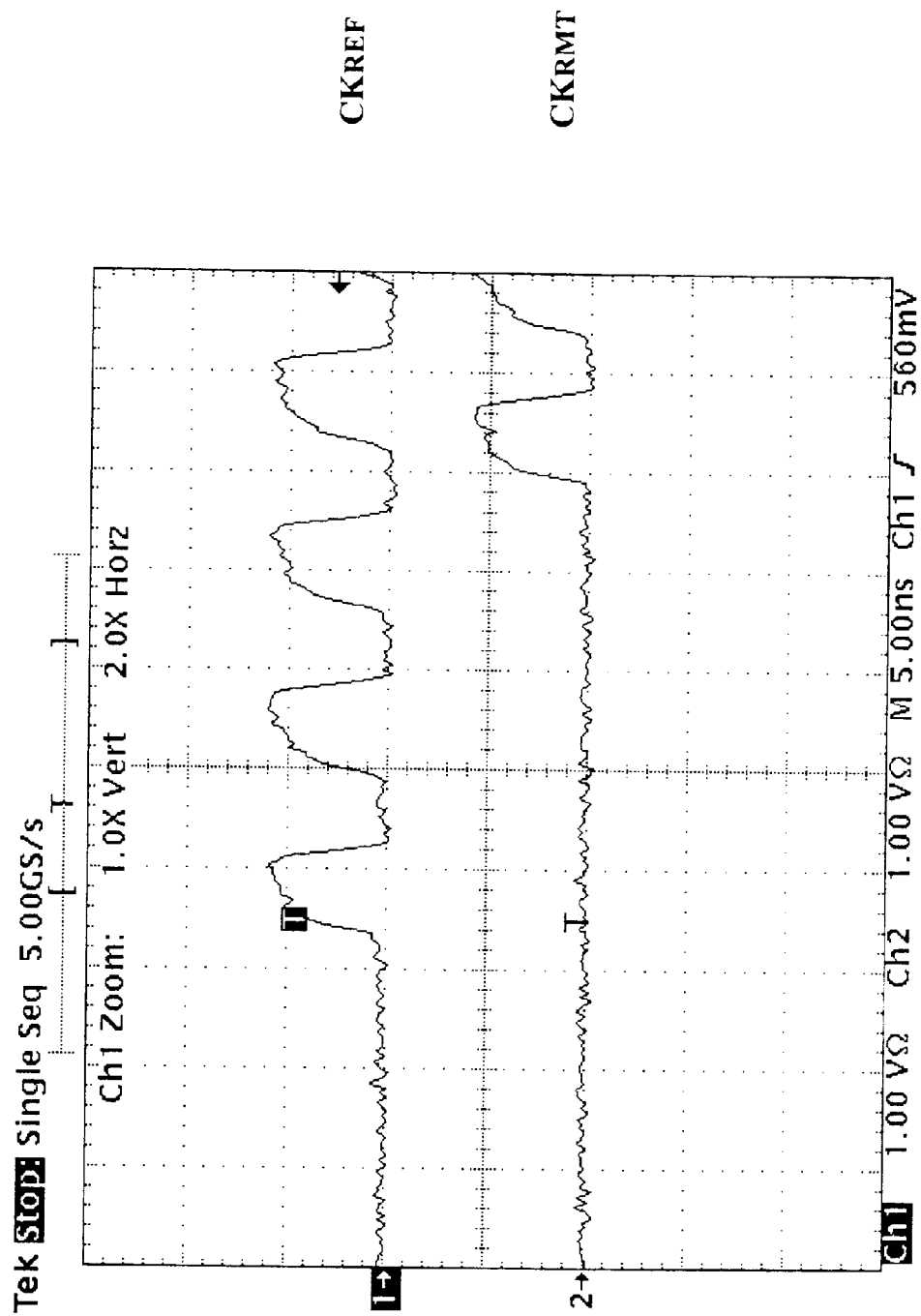
FIG. 12 shows the result of the test on the clock-deskew buffer chip made according to the method of the present invention, wherein, a waveform measured initially between the reference clock signal and the remote clock signal is depicted.
Figure 13:
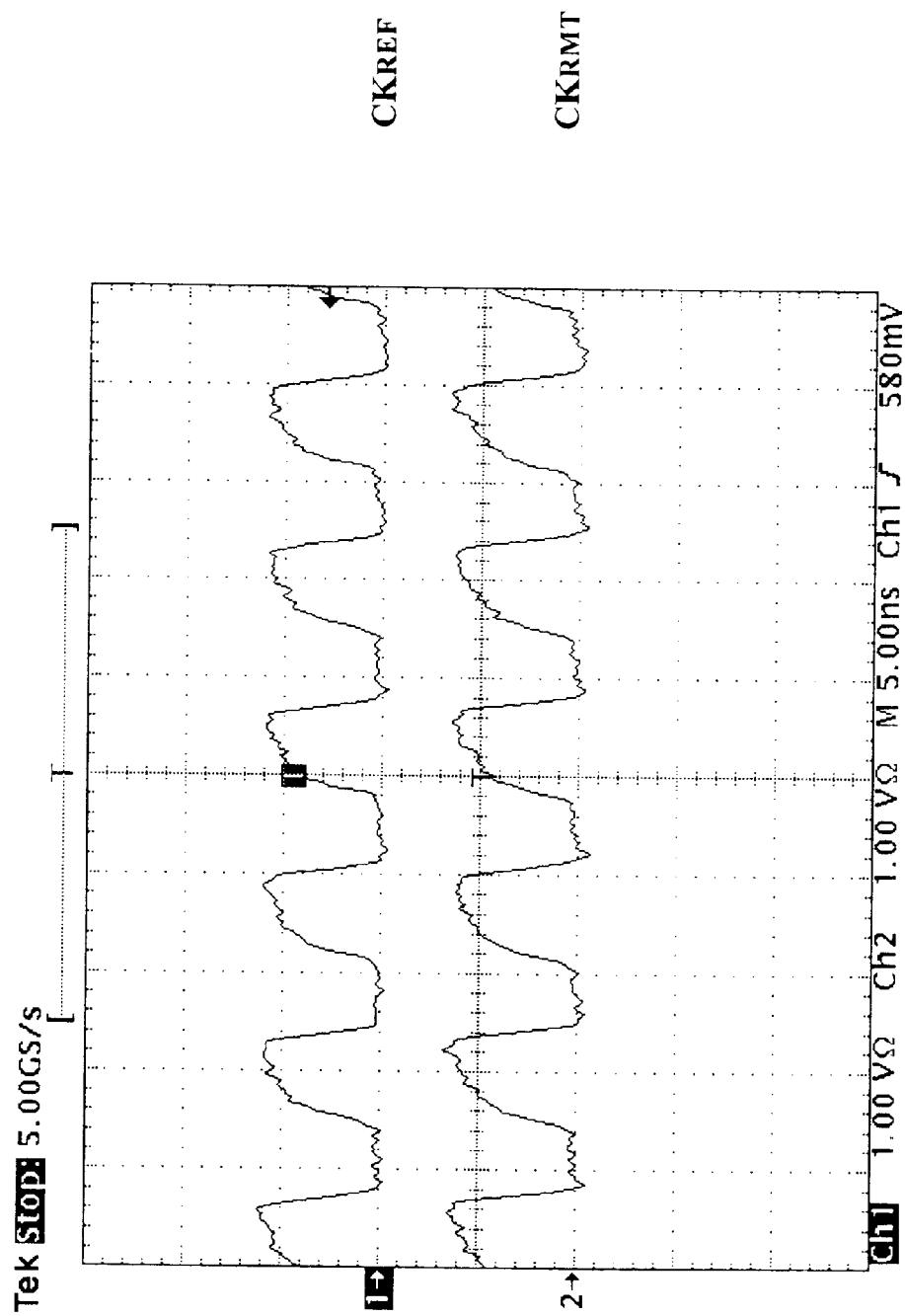
FIG. 13 shows the result of the test on the clock-deskew buffer chip made according to the method of the present invention, wherein, a waveform measured between the reference clock signal and the remote clock signal is depicted when in the steady state.
Figure 14:
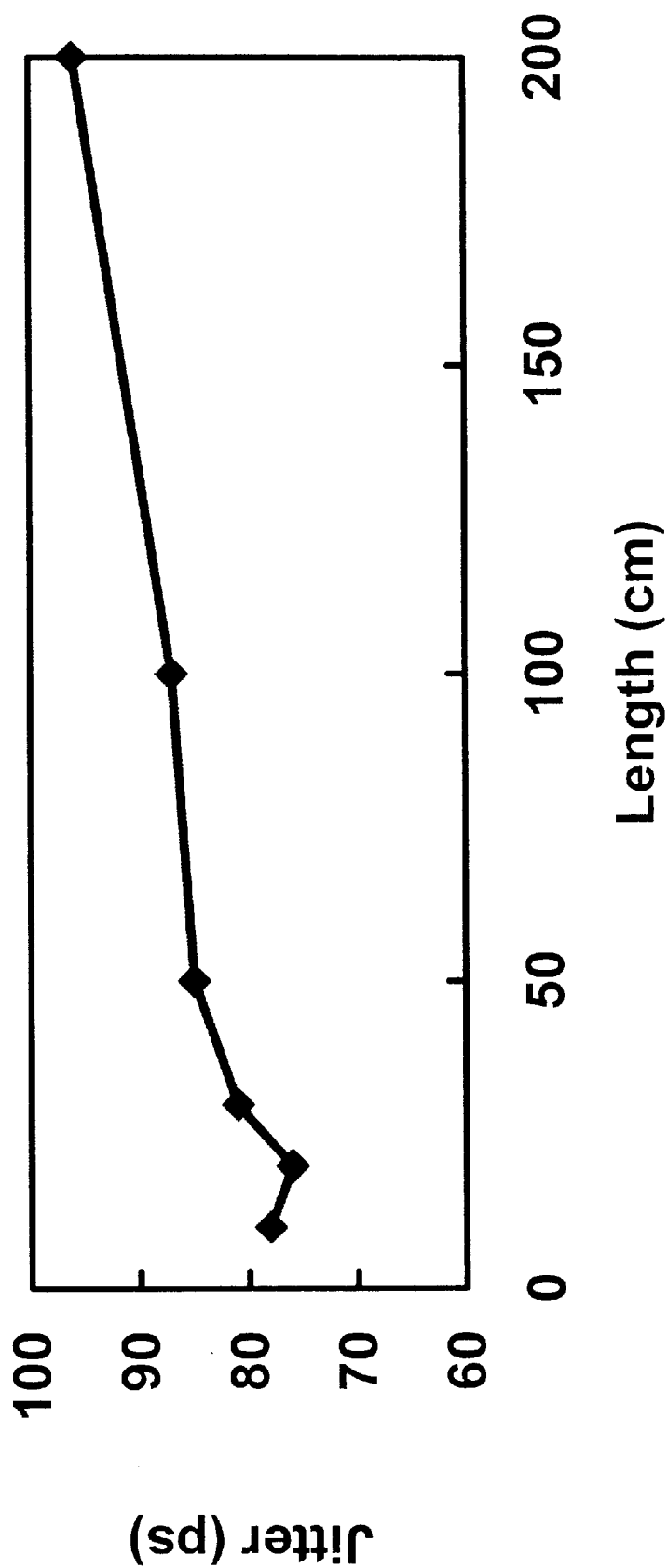
FIG. 14 shows the result of the test on the clock-deskew buffer chip made according to the method of the present invention, wherein, waveform jitter of signals measured for different transmission lengths is depicted.
Figure 15:
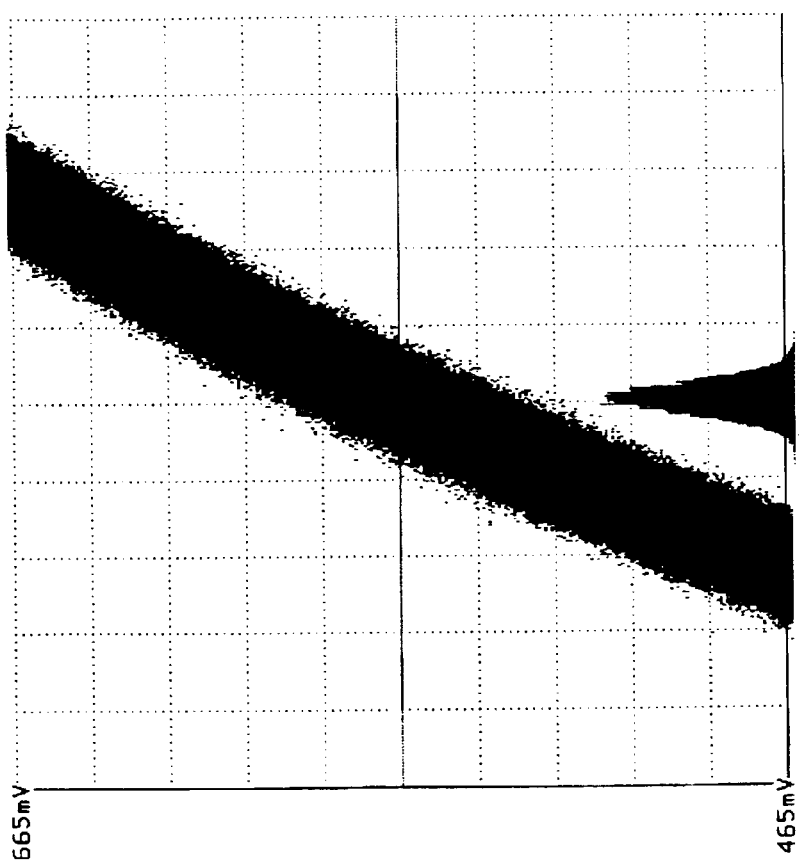
FIG. 15 shows the result of the test on the clock-deskew buffer chip made according to the method of the present invention, wherein, output signal jitter measured with a communication signal analyzer is depicted.

FIGS. 11–16 show the results of a test on the clock-deskew buffer chip made according to the method of the present invention with the clock frequency of 120 MHz applying on the system. Wherein, FIG. 11 shows the delay time of the clock signals on different lengths of transmission lines in the above equation (1) between the clock buffer chip and the remote chip when the start-up signal is applied initially. FIGS. 12 and 13 show the transient response of clock signals on a one-meter wire. FIG. 12 shows the measured waveforms of the reference clock ($CK_{REF}$) and the remote one ($CK_{RMT}$) respectively in the initial state as the start-up signal being just active, while FIG. 13 shows the steady state. FIG. 14 summarizes the measured performance of jitter of the signal versus length of transmission cable; for one-meter transmission cable, the performance of jitter of the signals measured is as shown in FIG. 15. The rms (root-mean-square) and peak-to-peak jitters of the deskewed output signal with the one-meter cable measured by CSA803A (Communication Signal Analyzer) are 10.8 ps and 87.0 ps respectively. The total power consumption of the clock-deskew buffer is measured to be 218 mW at a supply voltage of 3V. FIG. 16 summarizes the overall specifications of the clock-deskew buffer.

From the above stated results of the test on the clock-deskew buffer chip made according to the method of the present invention shown in FIGS. 11–16, it can be seen that, the present invention takes advantage of the one-wire clock-skew compensating method and the circuit provided for this method can surely get the effect of synchronization of the clock of a remote circuit with the clock input of the system to avoid errors in dealing with signals due to phase difference between the reference clock ($CK_{REF}$) and the remote clock ($CK_{RMT}$) as in conventional techniques.

The above statement is only for illustrating the contents of the techniques of the present invention, and not for giving any limitation to the scope of the present invention. It will be apparent to those skilled in this art that all equivalent modifications and changes without departing from the spirit and principle of the present invention shall fall within the scope of the appended claims and are intended to form part of this invention.

What is claimed is:

1. A one-wire clock-skew compensating method, wherein, a clock-deskew buffer composed of a delay locked loop and a bidirectional buffer is provided in the front of the signal transmission end of a single wire, while the other end of said single wire is provided with a receiving bidirectional buffer too, in this way, signals are transmitted bidirectionally at the same time on said single wire; when a signal is transmitted from said bidirectional buffer of said clock-deskew buffer to said receiving bidirectional buffer in a way passing through the forward and reverse paths of said single wire with identical propagation delay, the arrival time thereof is accurately controlled, thus avoid errors in dealing with signals due to phase difference between a reference clock and a remote clock as in conventional techniques.

2. A one-wire clock-skew compensating method as in claim 1, wherein, said delay locked loop is further provided with a phase detector, a plurality of divide-by-2 circuits are added in the front of said phase detector to avoid having the phase difference of $\pi$ radius and to ensure that output signals of said phase detector are in-phase.

3. A one-wire clock-skew compensating method as in claim 1, wherein, said delay locked loop is further provided with a charge pump including a wave filtering capacitor, starting action of said charge pump is controlled by a start-up controlled circuit, said charge pump is inactive initially, and the voltage on the filter of said charge pump is charged in advance to a half of the supply voltage.

4. A one-wire clock-skew compensating method as in claim 1, wherein, said delay locked loop is further provided with a phase detector, a charge pump including a wave filtering capacitor, two voltage control delay lines, a plurality of divide-by-2 circuits and a start-up controlled circuit.

5. A one-wire clock-skew compensating circuit, wherein, said circuit is provided between an external reference clock and a remote chip and is comprised of: a clock-deskew buffer composed of a delay locked loop and a first bidirectional buffer, a transmission wire and a second bidirectional buffer; when a signal on said external reference clock is transmitted through said clock-deskew buffer, said transmission wire and said second bidirectional buffer to said remote chip and then is transmitted back from said remote chip as a clock feedback signal, by identical electric length and propagation delay of the forward and reverse paths of said one transmission wire, mismatch resided in the conventional two-wire techniques is eliminated.

6. A one-wire clock-skew compensating circuit as in claim 5, wherein, said delay locked loop is further provided with a phase detector, a charge pump including a wave filtering capacitor and two voltage control delay lines.

7. A one-wire clock-skew compensating circuit as in claim 6, wherein, a plurality of divide-by-2 circuits are added in the front of said phase detector.

8. A one-wire clock-skew compensating circuit as in claim 6, wherein, said delay locked loop is further provided with a start-up controlled circuit, said charge pump is inactive initially, and the voltage on the filter of said charge pump is charged in advance to a half of the supply voltage.

9. A one-wire clock-skew compensating circuit as in claim 6, wherein, said phase detector is a dynamic phase detector.

10. A one-wire clock-skew compensating circuit as in claim 9, wherein, said dynamic phase detector is composed of two half-transparent registers.

11. A one-wire clock-skew compensating circuit as in claim 6, wherein, said voltage control delay lines are each formed from a ten-stage delay cell.

* * * * *